United States Patent [19]

Ito

[11] Patent Number: 5,745,803
[45] Date of Patent: Apr. 28, 1998

[54] VARIABLE ZOOM LENS HOOD

[75] Inventor: Naoki Ito, Tokyo, Japan

[73] Assignee: Asahi Kogaku Kogyo Kabushiki Kaisha, Tokyo, Japan

[21] Appl. No.: 841,753

[22] Filed: Apr. 28, 1997

Related U.S. Application Data

[63] Continuation of Ser. No. 626,546, Apr. 2, 1996, abandoned.

[30] Foreign Application Priority Data

Apr. 5, 1995 [JP] Japan .................. 7-104837

[51] Int. Cl.$^6$ .................. G03B 17/00; G03B 11/04
[52] U.S. Cl. .................. 396/83; 396/534
[58] Field of Search .................. 354/287, 187, 354/288; 396/534, 529, 83, 76, 71, 64, 63, 355, 448

[56] References Cited

U.S. PATENT DOCUMENTS

| | | | |
|---|---|---|---|
| 3,840,883 | 10/1974 | Choate | 396/448 |
| 4,896,175 | 1/1990 | Tahyer, Jr. | 354/76 |
| 5,227,825 | 7/1993 | Eguchi et al. | 354/287 |
| 5,280,317 | 1/1994 | Haraguchi et al. | 354/195.1 |
| 5,294,954 | 3/1994 | Nomura et al. | 354/287 |
| 5,313,329 | 5/1994 | Ueda | 359/676 |
| 5,327,184 | 7/1994 | Nomura et al. | 354/195.1 |

FOREIGN PATENT DOCUMENTS

| | | |
|---|---|---|
| 3123368 | 3/1983 | Germany. |
| 46-33495 | 10/1971 | Japan. |

OTHER PUBLICATIONS

An English Translation of German Patent Application No. 31 23 368 A1.
The Manual of Photography, Jacobson, Ralph E., Butterworth & Co., pp. 92–93, 1988.
Basic Photography, Langford, Michael J., Focal Press, p. 144, 1986.

*Primary Examiner*—Safet Metjahic
*Assistant Examiner*—Christopher E. Mahoney
*Attorney, Agent, or Firm*—Greenblum & Bernstein P.L.C.

[57] ABSTRACT

A pair of overlapping semi-cylindrical hood members are driven within a zoom lens barrel to slide in the direction of the optical axis, forming a substantially cylindrical lens hood, according to a zooming position of the zoom lens in a telephoto range, and to swing away from one another, forming a flared lens hood, according to a zooming position of the zoom lens in a wide angle range. The hood members are first slid to a maximum extension amount before swinging out in the case of a zooming position in the wide angle range. A detection switch detects when the hood members have been extended to the maximum extension amount. A control device detects the condition of the detection switch and the zooming position of the zoom lens, and controls the position and opening amount of the lens hood accordingly.

38 Claims, 5 Drawing Sheets

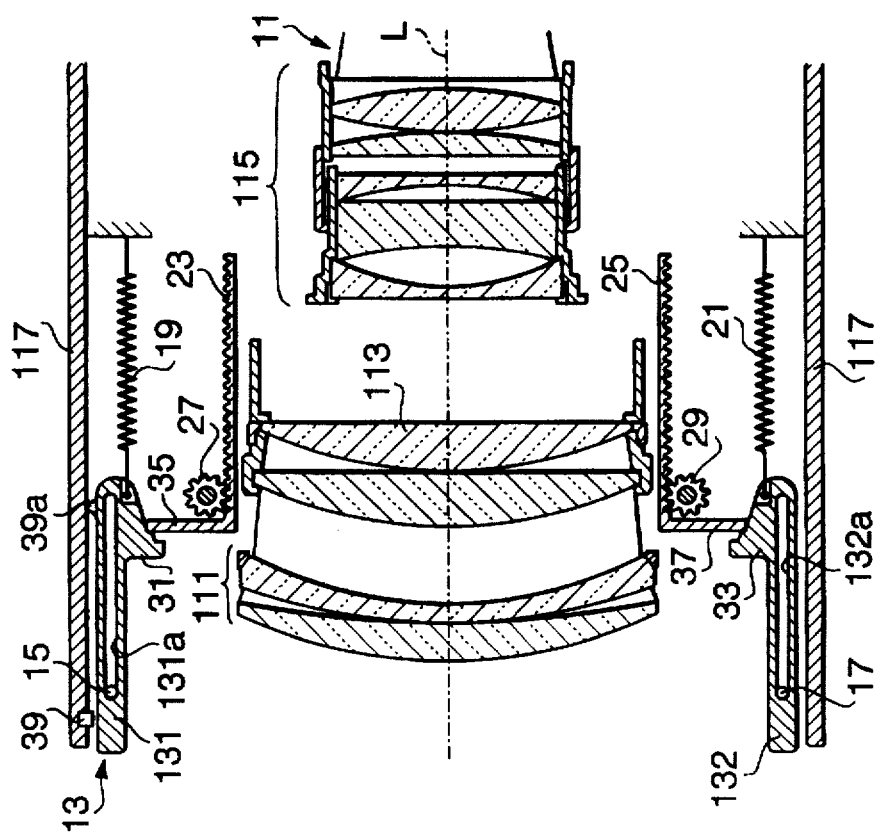
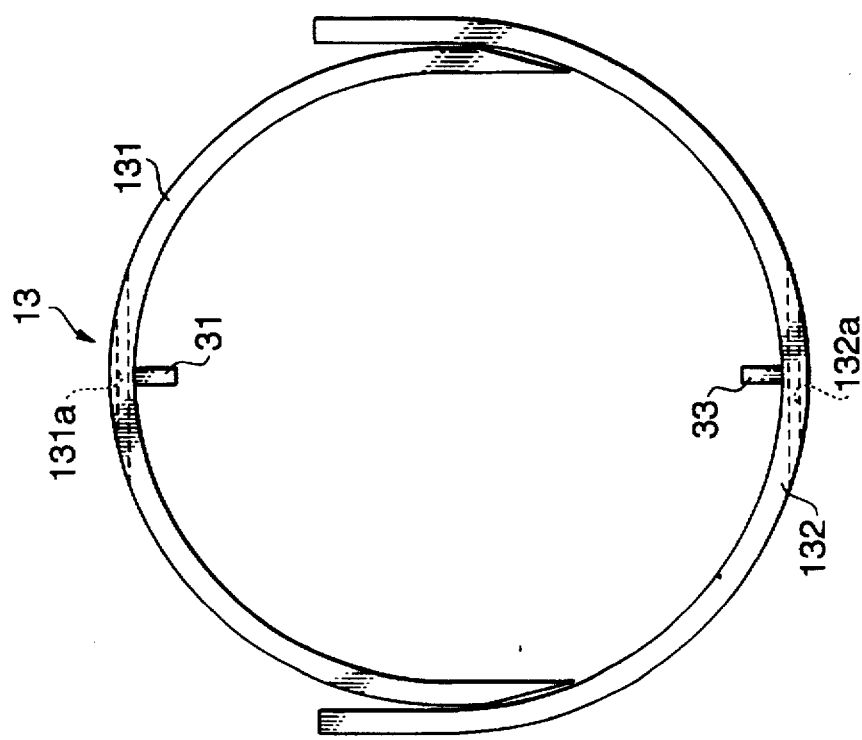

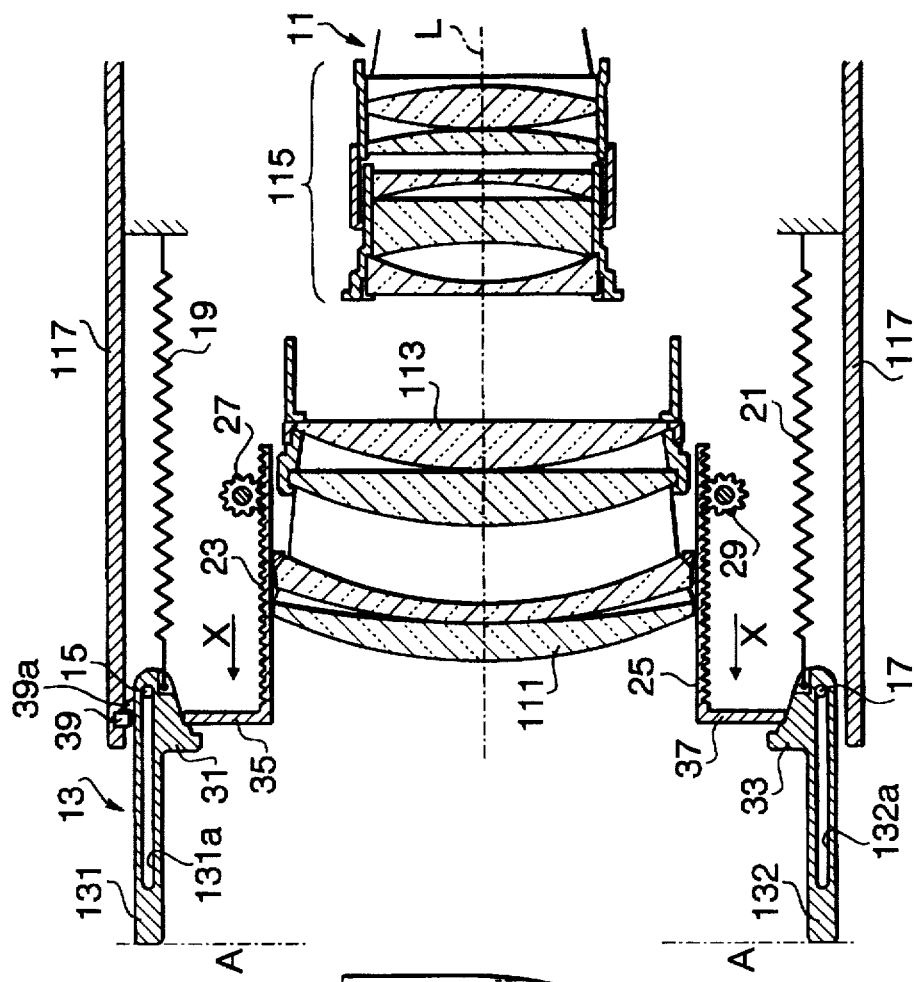
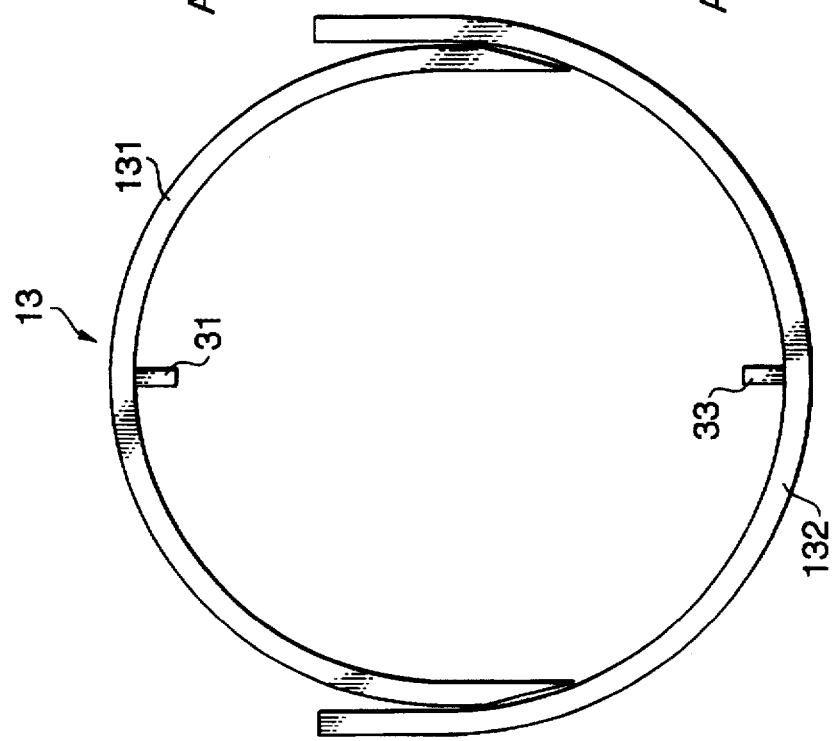
FIG. 2A
FIG. 2B

VARIABLE ZOOM LENS HOOD

This application is a continuation of application Ser. No. 08/626,546, filed Apr. 2, 1996, now abandoned.

BACKGROUND OF THE INVENTION

The present invention relates to a lens hood for a zoom lens and a device for moving the lens hood.

In order to prevent the intrusion of non-image-forming light from outside the angle of view of a lens, a lens hood is often mounted to the lens. The mounted lens hood is always constructed to match the angle of view of the lens.

The lens hood is the most important apparatus for preventing ghost images and lens flare, thereby allowing high contrast pictures. Lens hoods are used not only for wide angle and telephoto lenses, but also for zoom lenses having both wide angle and telephoto positions within the zooming range.

A conventional lens hood has a fixed length and opening angle. In the case of a zoom lens, a lens hood meeting the angle of view of the zoom lens at the wide angle position is conventionally used. However, the angle of view for the telephoto position is necessarily narrower than that of the wide angle position. If the lens hood meets the angle of view of the wide angle position of the zoom lens, the length and opening angle of the lens hood is usually not appropriate for the telephoto position, and vice versa.

More particularly, if a lens hood meeting the angle of view of the wide angle position of the zoom lens is used, when the zoom lens is positioned at the telephoto position, non-image-forming light invades from outside the angle of view of the telephoto position of the zoom lens, causing ghost imaging, veiling glare, or lens flare. Conversely, if the lens hood is designed to meet the angle of view of the telephoto position of the zoom lens, the length an opening angle lens of the lens hood is too narrow for the wide angle position, creating vignetting (wherein a peripheral portion of the image-forming light is shielded and lost), and the resulting photographs are dark or unexposed at peripheral portions.

In such cases, it becomes necessary to remove the lens hood, use a different lens hood, or to accept some degree of flare or vignetting.

SUMMARY OF THE INVENTION

It is therefore an object of the present invention to provide a variable lens hood and a device for moving the variable lens hood of a zoom lens, depending upon the angle of view of the zoom lens.

In order to meet this object, according to one aspect of the current invention, a lens hood device for a zoom lens of a camera includes a variable lens hood including at least one hood member, the hood member being continuously extendable from the zoom lens and swingable away from an optical axis of the zoom lens, a first guiding device for guiding the at least one hood member to extend from the zoom lens in a direction of the optical axis of the zoom lens, a second guiding device for guiding the at least one hood member to swing away from the optical axis of the zoom lens to a predetermined opening angle, a drive device for driving the first guiding device and the second guide device, and a control device for controlling the drive device to selectively extend and swing the at least one hood member.

Accordingly, the hood member or members can both extend from the zoom lens and swing away from the optical axis. In this manner, the hood member or members can form both a cylindrical or semi-cylindrical type lens hood suitable for telephoto focal lengths, and a flared-type lens hood suitable for wide-angle focal lengths, thereby appropriately shielding non-image-forming light for all focal lengths of the zoom lens.

In one development of this aspect of the invention, the zoom lens of the camera has a zoom lens drive for driving the zoom lens between zooming positions. The control device includes a device for sensing a zooming position of the zoom lens drive, an extension control device for controlling the drive device to extend the at least one hood member to a hood position corresponding to the sensed zooming position, a swinging control device for controlling the drive device to swing the at least one hood member away from the optical axis of the zoom lens to an opening angle corresponding to the sensed zooming position, and a device for selectively driving one of the extension control device and the swinging control device according to the sensed zooming position.

In this manner, the lens hood device is linked to the zoom lens drive, and appropriately changes the position of the hood member or members depending on the position of the zoom lens. That is, the hood member or members may be automatically extended when the zoom lens is moved to a telephoto position, and automatically swung away from each other when the zoom lens is moved to a wide-angle position.

In one development of this aspect of the invention, the first guiding device includes a longitudinal guide slot formed in the at least one hood member, the guide slot extending in the direction of the optical axis of the zoom lens, a cam plate having a first stepped portion provided on the at least one hood member, the at least one hood member moving in the direction of the optical axis of the zoom lens when the first stepped portion is pushed, and a guide pin fitting in the longitudinal guide slot, for guiding the at least one hood member to slide along the guide slot in the direction of the optical axis. This guiding structure allows the hood member or members to be extended in the direction of the optical axis.

In this case, the second guiding device preferably includes a second stepped portion provided to the cam plate provided to the at least one hood member; and an end portion of the guide slot formed in the at least one hood member, the at least one hood member swinging about the guide pin fitted in the end portion when the second stepped portion is pushed. This structure allows the hood member or members to be swung away from each other about the guide pins, which are also used to guide the hood member or members in extending from the zoom lens.

Further preferably, the drive device includes an engaging member for selectively pushing the first stepped portion and the second stepped portion a motor for driving the engaging member, and a device for moving the engaging member according to the driving of the motor. In this case, the engaging member can contact both of the first and second stepped portions, and the extending and swinging of the hood member or members can be performed using the same engaging member and the same motor. In one particular development, the device for moving the engaging member according to the driving of the motor includes a rack provided to the engaging member and a pinion provided to the motor, such that the pinion engages the rack.

Preferably, the second stepped portion is drivable only by a predetermined amount of extension of the at least one hood member from the zoom lens, and the control device further includes a sensor for detecting the predetermined amount of extension. In this manner, the swinging of the hood member or members can be controlled to take place by a certain amount of extension. In a particularly favorable development of this device, the control device includes a device for controlling the drive device to swing the at least one hood member in response to a detection of the predetermined amount of extension.

According to another aspect of the present invention, a lens hood device for a zoom lens of a camera includes a variable lens hood including at least one hood member, the at least one hood member being continuously extendable from the zoom lens and swingable away from an optical axis of the zoom lens, an extending device for extending the at least one hood member from the zoom lens in the direction of the optical axis of the zoom lens, a swinging device for swinging the at least one hood member away from the optical axis of the zoom lens to predetermined opening angles, a drive device for driving the extending device and the swinging device and a control device for controlling the drive device.

Accordingly, the hood member or members can both extend from the zoom lens and swing away from the optical axis. In this manner, the hood member or members can form both a cylindrical type lens hood suitable for telephoto focal lengths, and a flared-type lens hood suitable for wide-angle focal lengths, thereby appropriately shielding non-image-forming light for all focal lengths of the zoom lens.

In a particular development, the zoom lens of the camera has a zoom lens drive for driving the zoom lens between zooming positions, and the control device further includes a position sensing device for sensing a zooming position of the zoom lens drive, a position checking device for checking if the zooming position is greater or less than a predetermined reference position, and a selecting device for selectively controlling the drive device to drive one of the extending device and the swinging device depending on the position checking device.

In this manner, the lens hood device is linked to the zoom lens drive, and appropriately changes the position of the hood member or members depending on the position of the zoom lens. That is, the hood member or members may be automatically extended when the zoom lens is moved to a telephoto position, and automatically swung away from the optical axis when the zoom lens is moved to a wide-angle position.

Preferably, the swinging device is drivable only by a predetermined amount of extension of the at least one hood member from the zoom lens, and the position sensing device includes a sensor for detecting the predetermined amount of extension. In this case, the control device preferably includes a device for extending the at least one hood member to the predetermined amount of extension before the swinging device is driven.

In another particular development of this aspect of the invention, the extending device includes a first guiding device for guiding the at least one hood member to extend from the zoom lens in a direction of an optical axis of the zoom lens. The swinging device includes a second guiding device for guiding the at least one hood member to swing away from the optical axis of the zoom lens to predetermined opening angles. Consequently, the extending and swinging devices guide the hood member or members to extend and swing under the control of the control device.

In this case, the first guiding device preferably includes a longitudinal guide slot formed in the at least one hood member, the guide slot extending in the direction of the optical axis, a plate cam having a first stepped portion provided to the at least one hood member, the at least one hood member extending from the zoom lens when the first stepped portion is pushed, and a guide pin fitting in the longitudinal guide slot, for guiding the at least one hood member to slide along the guide slot in the direction of the optical axis of the zoom lens. Furthermore, the second guiding device preferably includes a second stepped portion provided to the plate cam provided to the at least one hood member an end portion of the guide slot formed in the at least one hood member, the at least one hood member swinging about the guide pin fitted in the end portion when the second stepped portion is pushed.

Accordingly, these guiding structures allow the hood member or members to be extended in the direction of the optical axis, and to be swung away from the optical axis about the guide pins, which are also used to guide the hood members in extending from the zoom lens. Preferably, the drive device includes an engaging member for contacting the first stepped portions and the second stepped portion a motor for driving the engaging member and a device for moving the engaging member according to the driving of the motor. In this case, the engaging member can contact both of the first and second stepped portions, and the extending and swinging of the hood member or members can be performed using the same engaging member and the same motor.

According to yet another aspect of the present invention, a lens hood device for a zoom lens of a camera includes a variable lens hood including at least one hood member, the at least one hood member being continuously swingable away from an optical axis of the zoom lens, a swinging device for swinging the at least one hood member away from the optical axis of the zoom lens to predetermined opening angles a drive device for driving the swinging device, and a control device for controlling the drive device.

Accordingly, the hood member or members can swing away from the optical axis. In this manner, the hood member or members can form both a cylindrical or semi-cylindrical type lens hood suitable for telephoto focal lengths, and a flared-type lens hood suitable for wide-angle focal lengths, thereby appropriately shielding non-image-forming light for all focal lengths of the zoom lens.

In one development of this aspect of the invention, the zoom lens of the camera has a zoom lens drive for driving the zoom lens between zooming positions, and the control device includes a position sensing device for sensing a zooming position of the zoom lens drive, a position checking device for checking if the zooming position is greater than or less than a predetermined reference position and a selecting device for selectively controlling the drive device to drive the swinging device depending on the position checking device.

In this manner, the lens hood device is linked to the zoom lens drive, and appropriately changes the position of the hood member or members depending on the position of the zoom lens. That is, the hood member or members may be automatically swung away from the optical axis when the zoom lens is moved to a wide-angle position.

In this case, the swinging device preferably includes a longitudinal guide slot formed in the at least one hood member, the guide slot extending in the direction of the optical axis, a plate cam, having a stepped portion, formed in the at least one hood member, and a guide pin fitting in the longitudinal guide slot, the at least one hood member swinging about the guide pin, fitted in an end portion of the longitudinal guide slot, when the stepped portion is pushed. This guiding structure allows the hood member or members to be easily swung away from the optical axis Preferably, the drive device includes: an engaging member for selectively pushing the stepped portion; a motor for driving the engaging member, and a device for moving the engaging member according to the driving of the motor.

For each of the aspects of the invention, the at least one hood member preferably includes, a plurality of hood members, the plurality of hood members overlapping one another at edges thereof and blocking non-image-forming light from entering the zoom lens. In this case, the plurality of hood members preferably overlap each other at edges thereof and block non-image-forming light from entering the zoom lens. In a particular embodiment, the hood members include a first hood member, substantially semi-circular in cross section and a second hood member, substantially semi-circular in cross section, and nested within the first hood member to form a substantially cylindrical shape. Preferably, the plurality of hood members swing away from one another to predetermined respective opening angles. In the case of first and second hood members, the first and second hood members swing away from each other.

Accordingly, both a cylindrical and a flared shape can be formed by the hood members, yet non-image-forming light is prevented from entering at the edges of the lens hood.

BRIEF DESCRIPTION OF THE DRAWINGS

FIG. 1A is a side schematic view of an embodiment of a lens hood device according to the invention, showing a first position of a lens hood;

FIG. 1B is a front schematic view of the lens hood of FIG. 1A, showing the first position of the lens hood;

FIG. 2A is a side schematic view of the embodiment of a lens hood device, showing a second position of the lens hood;

FIG. 2B is a front schematic view of the lens hood of FIG. 2A, showing the second position of the lens hood;

DETAILED DESCRIPTION OF THE PREFERRED EMBODIMENTS

Figures 3A, 3B:
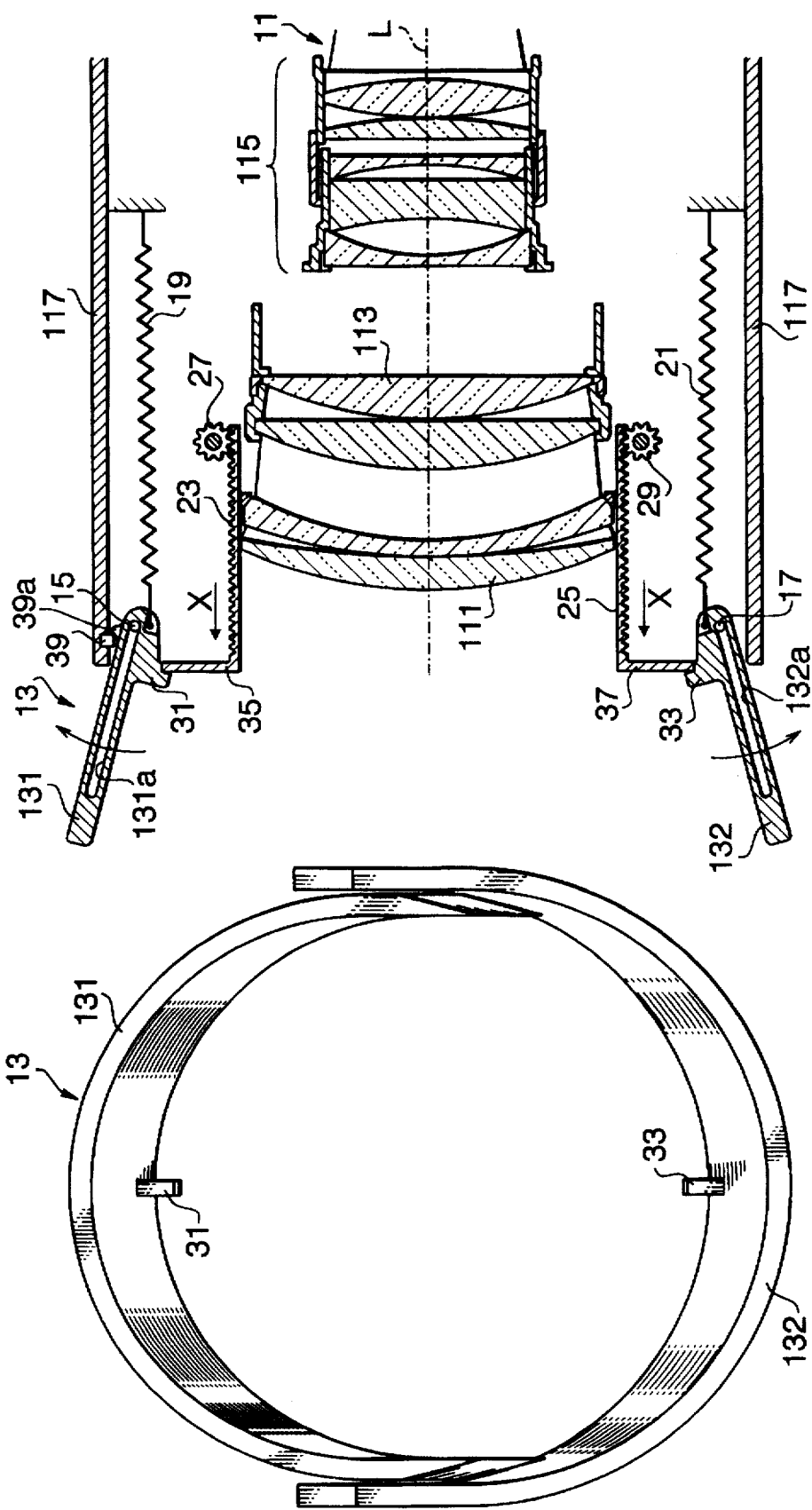
FIG. 3A is a side schematic view of the embodiment of a lens hood device, showing a third position of the lens hood.
FIG. 3B is a front schematic view of the lens hood of FIG. 3A, showing the third position of the lens hood.

As shown in FIGS. 1 through 3, a zoom lens 11 to which an embodiment of a lens hood device according to the invention includes a front lens group 111, a focusing lens group 113, and a zoom lens group 115 arranged (in that order) along an optical axis O. The front lens group 111 is fixed in a lens barrel 117 via a coupling mechanism (not shown), the focusing lens group 113 is supported in the lens barrel 117 by a focus adjusting mechanism (not shown) to move along the optical axis O, and the zoom lens group is supported by a zooming mechanism (not shown) to move along the optical axis O. For example, the zoom lens 11 is a bayonet type, attachable and removable from a single-lens reflex camera via a bayonet mount (not shown).

A variable lens hood 13 is provided to the zoom lens 11. The variable lens hood 13 includes left and right hood members 131 and 132, which each form a half-cylindrical sleeve having an outer diameter substantially corresponding to the inner diameter of the lens barrel 117. The left and right hood members 131 and 132 overlap at edge portions thereof, and are slidably attached to the inner wall of the lens barrel 117. That is, the left and right hood members 131 and 132 are slidable in the direction of the optical axis to extend from the lens barrel 117.

Guide slots 131a and 132a, respectively, are provided on the peaks of the arc of the half-cylindrical sleeve shapes of the upper and lower hood members 131 and 132. The guide slots 131a and 132a extend in the longitudinal direction (sliding direction) of the hood members 131 and 132. The guide slots 131a, 132b engage guide pins 15 and 17, respectively, provided on the inner wall of the lens barrel 117. The guide pins 15, 17, extend in a direction perpendicular to the guide slots 131a and 132a.

Springs 19 and 21, respectively, are connected between the inner side ends of the respective hood members 131 and 132 and the opposing lens barrel 117. The springs bias the hood members 131, 132, respectively, toward the inside of the lens barrel 117. Furthermore, in the lens barrel 117, racks 23 and 25, having a predetermined length, are attached to hood members 131 and 132, respectively, to move in the direction of the optical axis L. Pinions 27 and 29 engage the racks 23 and 25, respectively, to drive the racks in the direction of the optical axis L. The pinions 27 and 29 are synchronously driven by miniature motors 43 and 45 (described later).

Cam plates 31 and 33 are formed at the inner side front end portions of the respective hood members 131 and 132. Engaging members 35 and 37 are formed on one end of the racks 23 and 25, respectively, to engage the cam plates 31 and 33.

Figure 4:
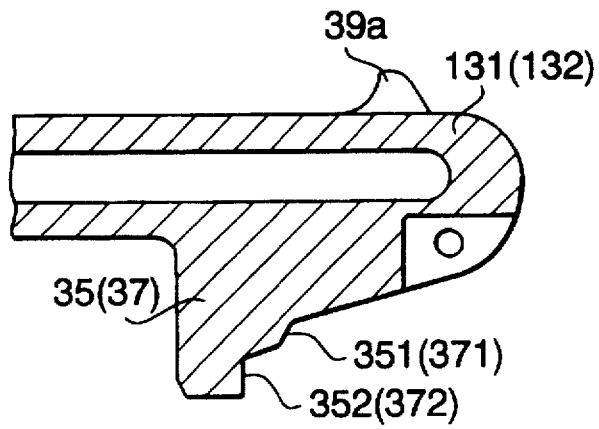
FIGS. 4 is a magnified side view of a cam plate of the lens hood.

As shown in FIG. 4, the cam plates 31 and 32 are provided with first stepped portions 351 and 371, and second stepped portions 352 and 372. The engaging members 35 and 37 contact the first stepped portions 351 and 371 until the lens hood 13 is moved to a telephoto end position (shown by the line A in FIG. 2A) corresponding to the end of the telephoto movement of the lens hood 13. That is, at the telephoto end position A, the variable lens hood 13 remains in a substantially cylindrical shape. At the telephoto end position, the lens-side end portion of the guide slots 131a, 132a contact the guide pins 15, 17 respectively, and linear extending motion of the hood members 131, 132 in the hood extending direction is stopped. If the racks 23 and 25 and corresponding engaging members 35 and 37 continue in the extending direction, they begin to swing the hood members 131, 132 away from each other, and contact the second stepped portions 352 and 372 provided to the plate cams 35 and 37, further swinging the hood members 131, 132 away from each other. Accordingly, the respective hood members 131 and 132 are swung about the guide pins 15 and 17, respectively, to form a flared lens hood shape as shown in FIGS. 3A and 3B. These guiding structures allow the hood members 131, 132 to be extended in the direction of the optical axis, and to be swung away from each other about the guide pins 15 and 17, which are also used to guide the hood members 131, 132 in extending from the zoom lens 11.

Accordingly, the hood members 131 and 132 can both extend from the zoom lens 11 and swing away from each other (i.e., each of the hood members 131 and 132 swings away from the optical axis). In this manner, the hood members 131 and 132 can form both a cylindrical type lens hood suitable for telephoto focal lengths, and a flared-type lens hood suitable for wide-angle focal lengths, thereby appropriately shielding non-image-forming light for all focal lengths of the zoom lens 11.

In FIGS. 1A, 2A, and 3A, reference numeral 39 represents a position detecting switch 39 for detecting that the lens hood 13 has reached the end of the maximum telephoto extension position. Actuator pin 39a, attached to the left hood member 131, presses on the position detecting switch 39 at the maximum telephoto extension position, and remains in contact with the position detecting switch 39 as the hood members 131, 132 are swung open.

Figure 5:
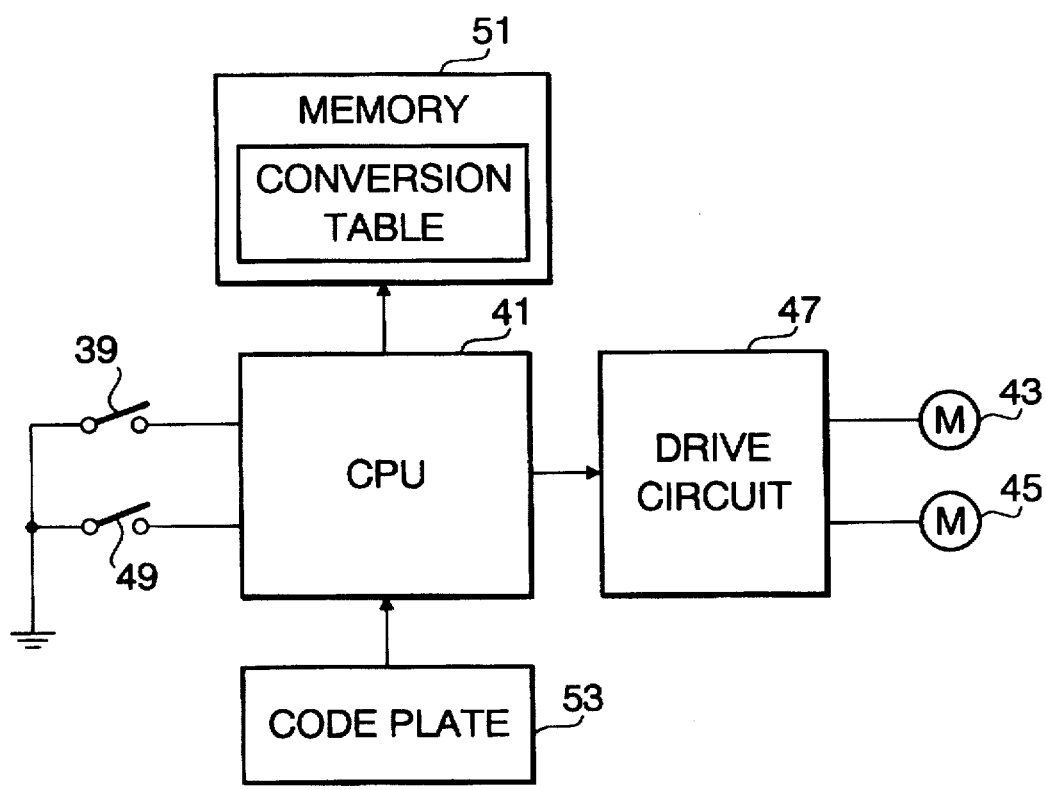
FIG. 5 is a block diagram depicting the control circuit of the embodiment of a lens hood device.

FIG. 5 shows a block diagram of a control circuit for controlling the variable lens hood 13. A central processing unit (CPU) 41 controls the overall operation of the device. Miniature motors 43 and 45 for driving the lens hoods 13 toward the telescoping position and the wide angle position are connected via a driving circuit 47 to the CPU 41. The miniature motor 43 drives the pinion 27 on the hood 131 side, while the miniature motor 45 drives the pinion 29 on the hood member 132 side. A power switch 49, the position detecting switch 39, and a memory 51 are also connected to the CPU 41. The current focal length information of the zoom lens 11 is obtained from a code plate 53, and is transmitted to the CPU 41. An arithmetic-program for controlling motor movements of the motors 43 and 45 is stored in the memory 51. That is, the moving amount of the lens hood 13 toward telephoto and wide angle positions is controlled based upon the present focal length information.

In order to control the moving amount of lens hood 13, a processing program, a conversion table for calculating a motor driving amount from the focal length information, and data such as motor control amounts calculated at the CPU 41 are stored in the memory 51.

It should be noted that in the above embodiment, the CPU 41 combined with the code plate 53 corresponds to a zooming position sensing means. Rack 23, 25, pinion 27, 29, plate cam 27, 29, and motor 43 and 45 correspond to driving means for the lens hood 13. Further, although each of racks 23, 25, pinions 27, 29, and motor 43, 45 are duplicated on opposite sides of the lens barrel 117, the embodiment alternatively may use only a single set of motor, rack, and pinion to drive the lens hood 13 without departing from the spirit and scope of the invention.

Figure 6:
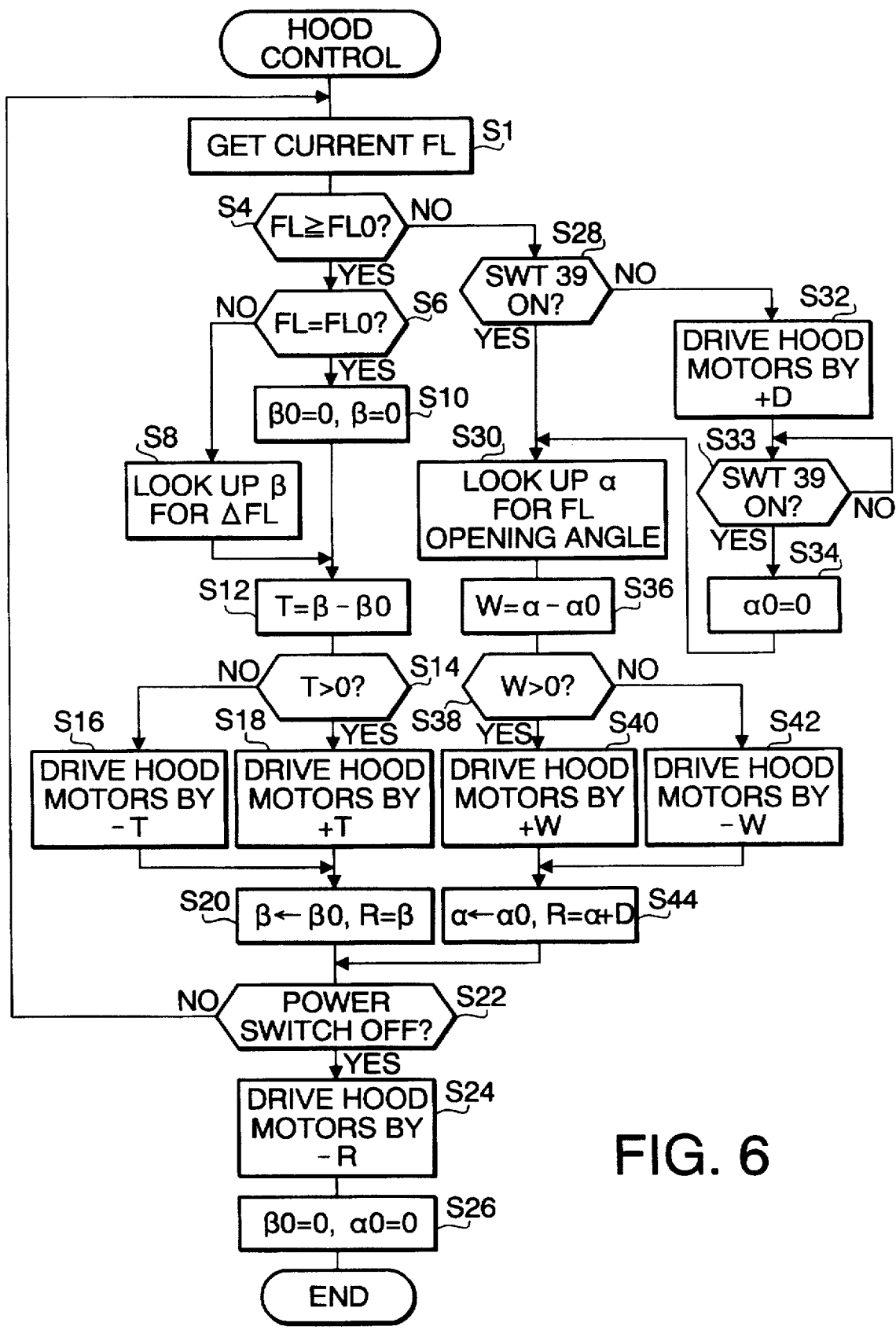
FIG. 6 is a flow chart showing an embodiment of a process for controlling the lens hood.

A process for controlling the lens hood 13 is shown in FIG. 6. Along the telephoto to wide angle range, the zoom lens 11 moves from a maximum telephoto amount, through various telephoto positions, to the reference position (corresponding to reference focal length FLO), and then through various wide angle positions to a maximum wide angle position. The lens hood 13 moves from the maximum extension position at the maximum telephoto amount (the telephoto end position, corresponding to the maximum extension amount S, shown in FIGS. 2A and 2B), through a minimum extension amount at the reference position (having no extension, shown in FIGS. 1A and 1B), to a maximum opening amount at the maximum wide angle position. The operation is similar in the reverse direction.

When the power switch 49 is OFF, the lens hood 13 is housed in the lens barrel 117, as shown in FIG. 1A. At this time, the zoom lens 11 is returned to its reference focal length FLO (for example, 50 mm). Based upon the housed position of the lens hood 13 at the time of the reference focal length FLO, hood control is carried out according to the process of FIG. 6, taking into account the viewing angle of the zoom lens at the telephoto and wide angle positions. That is, the control is carried out in accordance with the focal length FL, which is inversely proportional to the angle of view.

When the power switch 49 is turned ON, and a zoom lens 11 which was at the reference focal length FLO is moved to some zooming position, the CPU 41 first detects the current focal length FL of the zoom lens 11 based upon the focal length information from the code plate 53 at step S1. Then, the process checks whether the current focal length FL is equal to or larger than the reference focal length FLO at step S4. That is, at step S4, the process checks whether the zoom lens 11 is currently in a telephoto or wide angle position.

If the current focal length FL is equal to or larger than the reference focal length FLO (Y at step S4), meaning the zoom lens is at the reference position or in a telephoto position, the process then checks if the current focal length FL is equal to the reference focal length FLO at step S6. If the current focal length FL is not equal to the reference focal length FLO (N at step S6), then the process advances to a step S8. In step S8, based upon the detected current focal length FL, the look-up motor control amount β, corresponding to the hood extending amount from the reference position (the hood position at the reference focal length FLO) is calculated by referring to the conversion table stored in the memory 51. From step S8, the process proceeds to step S12.

At step S6, if the current focal length FL is equal to the reference focal length FLO (Y at step S6), the process proceeds to a step S10. In step S10, a stored motor control amount β0, previously calculated, is set to zero in the memory. As from step S8, at step S10, the process proceeds to step S12. At step S12, the actual control amount T, obtained by subtracting the stored motor control amount β0 from the look-up motor control amount β. The actual motor control amount T is used in controlling the driving of the lens hood 13 in order to add a compensation step in the control, such that the proper lens hood position is not significantly over or undershot.

The process then checks if the actual control amount T is positive (extension) or negative (retraction) at step S14. If the actual control amount T is positive (Y at step S14), the CPU 41 sends instructions to the drive circuit 47 to drive the miniature motors 43 and 45 to move the zoom lens hood 13 in a direction extending from the lens barrel 11 at step S18 by an amount corresponding to the actual control amount (+T) in step S18. When the miniature motors 43 and 45 are driven in the hood extending direction, the pinions 27 and 29 are rotated in a clockwise direction (from the viewpoint of FIG. 1A).

Accordingly, the racks 23 and 25, which engage pinions 27 and 29, respectively, are moved in the direction of the arrow X illustrated in FIG. 2A. Simultaneously, the respective hood members 131 and 132 are moved in the direction of the arrow X against the biasing force of the springs 19 and 21, and engaging the engaging members 35 and 37 with the stepped portions 351 and 371 of the cam plates 32 and 33, respectively. Thereby, the lens hood 13 is extended from the lens barrel 117, as shown in FIG. 2A, by an amount corresponding to the actual control amount T. The actual control amount T is always less than a maximum extension amount D of the lens hood 13 toward the telephoto side, corresponding to the telephoto end position, i.e., the extending amount just prior to initiation of the rotation of the respective hood members about the guide pins 15 and 17, and the position at which the guide pins 15 and 17 engaging the ends of the guide slots 131a and 132a of the respective hood members 131 and 132. The process then proceeds to step S20.

If the actual control amount T is negative (N at step S14), the zooming toward the reference position (although still in the telephoto range) is being performed, and the process proceeds to step S16. In step S16, the CPU 41 sends instructions to the drive circuit 47 to drive the miniature motors 43 and 45 to move the zoom lens hood 13 in a direction to retract into the lens barrel 11 at step S16 by an amount corresponding to the actual control amount (-T). Thus, the lens hood 13 is retracted into the lens barrel 117 by an amount corresponding to the actual control amount T. The process then proceeds, as after step S18, to step S20.

In step S20, the look-up motor control amount $\beta$ is stored in the memory 51 as stored control amount $\beta0$, used to obtain a subsequent actual control amount T. The value of $\beta$ is then stored in the memory 51 as a retracting control amount R. The process then proceeds to step S22, where the power switch 49 status is checked.

At step S4, if the current focal length FL is less than the reference focal length FLO (N at step S4), then the zoom lens is in a wide angle position. In this case, from step S4, the process proceeds to step S28.

The initial position of the variable lens hood 13 (at the beginning of the wide angle range) must correspond to the maximum extension amount D of the lens hood 13 toward the telephoto side, corresponding to the telephoto end position, i.e., the extending amount just prior to initiation of the rotation of the respective hood members about the guide pins 15 and 17, and the position at which the guide pins 15 and 17 engaging the ends of the guide slots 131a and 132a of the respective hood members 131 and 132. Accordingly, a motor control amount $\alpha$ is calculated based upon this initial position.

At step S28, the position detecting switch (SWT) 39 is checked to determine the position of the lens hood 13. If the position detecting switch (SWT) 39 is ON (Y at step S28), then the variable lens hood 30 is at least at the maximum telephoto extension amount D (meaning that it has already been moved in the wide angle range or is in a suitable position to be moved in the wide angle range), and the process advances to step S30.

As previously described, along the telephoto to wide angle range, the zoom lens 11 moves from a maximum telephoto amount, through various telephoto positions, to the reference position (corresponding to reference focal length FLO), and then through various wide angle positions to a maximum wide angle position. The lens hood 13 moves from the maximum extension position at the maximum telephoto amount (the telephoto end position, corresponding to the maximum extension amount S, shown in FIGS. 2A and 2B), through a minimum extension amount at the reference position (having no extension, shown in FIGS. 1A and 1B), to a maximum opening amount at the maximum wide angle position. Accordingly, as the zoom lens 11 is moved through the reference focal length FLO to a focal length less than FLO, the lens hood 13 is at its minimum extension. Further, if the current focal length FL is less than FLO (N at step S4), but the position detecting switch 39 is still OFF (N at step S28), the lens hood 13 is at its minimum extension amount, and must be moved by the maximum extension mount D in order to reach the beginning of the range in which the hood members 131 and 132 may be swung away from each other.

Accordingly, if the position detecting switch (SWT) 39 is OFF (N at step S28), the CPU 41 instructs the drive circuit 47 to drive the miniature motors 43 and 47 to move the hood in the extension direction by the maximum extension amount D, moving the lens hood 13 to its maximum extension at step S32. At the maximum extension, the initial position of the hood opening is reached. In step S33, the process loops until the position detecting switch (SWT) 39 turns ON (Y at step S33) confirming that the lens hood 13 has reached the maximum extension amount D, and then advances to step S34. Thereafter, at step S34, a stored motor control amount $\alpha0$ (described later) is cleared (set to zero), as the lens hood 13 is at the beginning of the opening range where the hood members 131, 132 may be moved away from one another. The process then advances to step S30.

In step S30, a motor control amount $\alpha$ (representing an amount of swinging or opening of the hood members 131, 132) is calculated based upon the current focal length FL, referring to the conversion table in the memory 51, and step S36 is executed. In step S36, an actual control amount W is calculated by subtracting the stored motor control amount $\alpha0$ from the calculated motor control amount $\alpha$. The actual motor control amount W is used in controlling the driving of the lens hood 13 in order to add a compensation step in the control, such that the proper lens hood opening amount is not significantly over or undershot.

The process then checks if the actual control amount W is positive (swinging open) or negative (swinging closed) at step S38. If the actual control amount W is positive (Y at step S38), the CPU 41 sends instructions to the drive circuit 47 to drive the miniature motors 43 and 45 to move the hood members 131 and 132 in the hood opening direction (swinging away from one another, the same direction as the previous extension direction) at step S40 by an amount corresponding to the actual control amount (+W) in step S40. When the miniature motors 43 and 45 are driven in the hood extending direction, the pinions 27 and 29 are rotated in a clockwise direction (from the viewpoint of FIG. 3A).

Accordingly, the racks 23 and 25, which engage pinions 27 and 29, respectively, are further moved in the direction of the arrow X illustrated in FIG. 3A from the maximum telephoto extension position shown in FIG. 2A. At this time, as the ends of the guide slots 131a and 132a of the respective hood members 131 and 132 engage the guide pins 15 and 17 as shown in FIG. 2A, upon movement of the racks 23 and 25 in the direction of the arrow X, the engaging members 35 and 37 are released from the stepped portion 351 and 371 of the plate cams 32 and 33 to engage the stepped portions 352 and 372, thereby outwardly rotating the respective hood members 131 and 132 about the guide pins 15 and 17, as illustrated in FIG. 3A. Accordingly, the lens hood 13 is opened (as the hood members 131, 132 swing away from one another) by the amount corresponding to the actual motor control amount W to set the lens hood 13 to open to meet the angle of view of the zoom lens 117. The process then proceeds to step S44.

If the actual control amount W is negative (N at step S38), the zooming toward the reference position (although still in the wide angle range) is being performed, and the process proceeds to step S42. In step S42, the CPU 41 sends instructions to the drive circuit 47 to drive the miniature motors 43 and 45 to move the hood members 131 and 132 by an amount corresponding to the actual control amount (-W). Thus, the lens hood 13 is swung closed by an amount corresponding to the actual control amount W. The process then proceeds, as after step S40, to step S44.

In step S44, the look-up motor control amount $\alpha$ is stored in the memory 51 as stored control amount $\alpha0$, used to obtain a subsequent actual control amount W. The value of $\alpha+D$ is then stored in the memory 51 as the retracting control amount R. The process then proceeds to step S22, where the power switch 49 status is checked.

If the power switch 49 is ON (N at step S22), then the process returns to step S1 and repeats.

However, if the power switch 49 is OFF (Y at step S22), the process proceeds to step S24. In step S24, the CPU 41 instructs the drive circuit 47 to rotate the miniature motors 43 and 45 by the retracting control amount −R (in the hood retracting direction) to retract the lens hood 13 to its reference position, corresponding to the reference focal length FL0. Thereafter, in step S26, the stored motor control amounts β0 and α0 (described later) are cleared (i.e., set to zero). The process then ends.

In this manner, the lens hood device is linked to the zoom lens drive, and appropriately changes the position of the hood members 131 and 132 depending on the position of the zoom lens 11. That is, the hood members 131 and 132 may be automatically extended when the zoom lens 11 is moved to a telephoto position, and automatically swung away from each other when the zoom lens 11 is moved to a wide-angle position.

According to the embodiment, it is checked whether the zoom lens 11 is at a telephoto or wide angle position, based upon the current focal length FL taken from the code plate 53. When the zoom lens 11 is in a telephoto position, a control amount β corresponding to a hood extension amount of the lens hood 13 is calculated based on the current focal length FL, and the actual control amount T is obtained by subtracting a stored motor control amount β0, and the motors 43 and 45 are driven by T in the direction to extend or retract the lens hood 13.

If the zoom lens 11 is on the wide angle side, a control amount a corresponding to the opening angle of the lens hood 13 is calculated based upon the current focal length FL, and an actual control amount W is obtained by subtracting a stored control amount α0, and the motors 43 and 45 are driven to open or close the lens hood 13. If the zoom lens 11 has just moved into the side angle range, the lens hood 13 is first delivered to its maximum extension amount (D).

Accordingly, the lens hood 13 can be automatically set at the proper extension amount and opening angle depending on the angle of view of the zoom lens 11, whether the zoom lens 11 be set at a wide angle or telephoto position. As a result, a single lens hood can be used for both wide angle and telephoto photography with a zoom lens.

It should be noted that although the driving means for moving the lens hood 13 to a wide angle or telephoto photo position includes the racks 23, 25, pinions 27, 29, cam plates 31, 33, and motors 43, 45, the invention is not limited to this structure, and the lens hood driving mechanism can be integrated with the zoom lens group 115 driving mechanism or the focusing lens group 11 driving mechanism. Furthermore, motors for driving the hood mechanism may be provided in a camera body, and the driving force transmitted to the hood driving mechanism by a coupling.

Furthermore, the lens hood 13 may be alternatively provided to the outer circumference of the lens barrel 117 without departing from the scope or spirit of the invention.

The present disclosure relates to subject matter contained in Japanese Patent Application No. HEI 07-104837, filed on Apr. 5, 1995, which is expressly incorporated herein by reference in its entirety.

What is claimed is:

1. A lens hood device for a zoom lens of a camera, said zoom lens of said camera having a zoom lens drive for driving said zoom lens between a plurality of zooming positions, each zooming position having a corresponding focal length of said zoom lens, comprising:

a variable position lens hood including at least one hood member, said at least one hood member being continuously extendable from said zoom lens and swingable with respect to an optical axis of said zoom lens;

first guiding means for guiding said at least one hood member to extend from said zoom lens in a direction of the optical axis of said zoom lens;

second guiding means for guiding said at least one hood member to swing away from the optical axis of said zoom lens to a predetermined opening angle;

driving means for driving said first guiding means and said second guiding means; and control means for controlling said drive means to selectively extend and swing said at least one hood member, said control means comprising:

means for sensing said zooming position of said zoom lens drive;

extension control means for controlling said drive means to extend said at least one hood member to a hood position corresponding to said sensed zooming position, each hood position having a corresponding zooming position of said zoom lens;

swinging control means for controlling said drive means to swing said at least one hood member away from the optical axis of said zoom lens to an opening angle corresponding to said sensed zooming position, each opening angle having a corresponding zooming position of said zoom lens; and means for selectively driving one of said extension control means and said swinging control means according to said sensed zooming position.

2. The lens hood device according to claim 1, wherein said first guiding means comprises:

a longitudinal guide slot formed in said at least one hood member, said guide slot extending in the direction of the optical axis of the zoom lens;

a cam plate having a first stepped portion provided to said at least one hood member, said at least one hood member movable in the direction of the optical axis of the zoom lens when said first stepped portion is pushed; and a guide pin fitting in said longitudinal guide slot, for guiding the at least one hood member to slide along said guide slot in the direction of the optical axis.

3. The lens hood device according to claim 2, wherein said second guiding means comprises:

a second stepped portion provided to said cam plate provided to said at least one hood member; and an end portion of said guide slot formed in said at least one hood member, said at least one hood member swingable about said guide pin fitted in said end portion when said second stepped portion is pushed.

4. The lens hood device according to claim 3, wherein said drive means comprises:

an engaging member for selectively pushing said first stepped portion and said second stepped portion;

a motor for driving said engaging member; and means for moving said engaging member according to the driving of said motor.

5. The lens hood device according to claim 4, wherein said means for moving said engaging member according to the driving of said motor comprises;

a rack provided to said engaging member; and a pinion provided to said motor, said pinion engaging said rack.

6. The lens hood device according to claim 4,
wherein said second stepped portion is pushed at a predetermined amount of extension of said at least one hood member from said zoom lens, and
wherein said control means further comprises a sensor for detecting said predetermined amount of extension.

7. The lens hood device according to claim 6,
wherein said control means includes means for controlling said drive means to swing said at least one hood member in response to a detection of said predetermined amount of extension by said sensor.

8. The lens hood device according to claim 1, wherein said at least one hood member comprises:
a first hood member, substantially semi-circular in cross section; and
a second hood member, substantially semi-circular in cross section, and nested within said first hood member to form a substantially cylindrical shape.

9. The lens hood device according to claim 8,
wherein said first hood member and said second hood member overlap each other at edges thereof and block non-image-forming light from entering the zoom lens.

10. The lens hood device according to claim 9, wherein said second guide means comprises:
means for guiding said first hood member and said second hood member to swing away from each other to predetermined respective opening angles.

11. The lens hood device according to claim 1,
wherein said at least one hood member comprises: a plurality of hood members, said plurality of hood members overlapping one another at edges thereof and blocking non-image-forming light from entering the zoom lens.

12. The lens hood device according to claim 11, wherein said second guide means comprises:
means for guiding said plurality of hood members to swing away from one another to predetermined respective opening angles.

13. The lens hood device according to claim 1, wherein the zoom lens is a detachable lens, detachable and attachable to a single lens reflex camera.

14. A lens hood device for a zoom lens of a camera, said zoom lens of said camera having a lens barrel and a zoom lens drive for driving the zoom lens between a plurality of zooming positions, each zooming position having a corresponding focal length of said zoom lens, comprising;
a variable position lens hood including at least one hood member extended from said lens barrel in a direction of an optical axis of said zoom lens, said at least one hood member being continuously swingable with respect to said optical axis of said zoom lens;
a swinging assembly that swings said at least one hood member, about an axis perpendicular to the optical axis, away from the optical axis of said zoom lens to a plurality of predetermined opening angles, each predetermined opening angle having a corresponding zooming position of said zoom lens;
a drive assembly that drives said swinging assembly; and
a controller that controls said drive assembly, said controller comprising:
a position sensing assembly that senses a zooming position of said zoom lens drive and outputs a zooming position value;
a position checking system that checks if said zooming position value is greater than or less than a predetermined reference value representative of a predetermined reference focal length; and
a selecting system tat selectively controls said drive assembly to drive said swinging assembly depending on said position checking system.

15. The lens hood device according to claim 14, wherein said swinging assembly comprises:
a longitudinal guide slot formed in said at least one hood member, said guide slot extending in the direction of the optical axis;
a cam plate, having a stepped portion, formed in at least one hood member; and
a guide pin fitting in said longitudinal guide slot, said at least one hood member swinging about said guide pin fitted in an end portion of said longitudinal guide slot when said second stepped portion is pushed.

16. The lens hood device according to claim 15, wherein said drive assembly comprises:
an engaging member for selectively pushing said stepped portion;
a motor for driving said engaging member; and
a system that moves said engaging member according to the driving of said motor.

17. The lens hood device according to claim 14, further comprising:
an extending mechanism that extends said at least one hood member from said zoom lens in the direction of the optical axis of the zoom lens, and
wherein said swinging assembly is drivable only at a predetermined amount of extension of said at least one hood member from said zoom lens, and
wherein said position sensing assembly comprises a sensor for detecting said predetermined amount of extension.

18. The lens hood device according to claim 14, wherein said at least one hood member comprises:
a first hood member, substantially semi-circular in cross section; and
a second hood member, substantially semi-circular in cross section, and nested within said first hood member to form a substantially cylindrical shape.

19. The lens hood device according to claim 18,
wherein said first hood member and said second hood member overlap each other at edges thereof and block non-image-forming light from entering the zoom lens.

20. The lens hood device according to claim 19, wherein said swinging assembly comprises:
a mechanism that swings said first hood member and said second hood member away from each other to predetermined opening angles.

21. The lens hood device according to claim 14,
wherein said at least one hood member comprises: a plurality of hood members, said plurality of hood members overlapping one another at edges thereof and blocking non-image-forming light from entering the zoom lens.

22. The lens hood device according to claim 21, wherein said swinging assembly comprises:
a mechanism that swings said plurality of hood members away from one another to predetermined opening angles.

23. The lens hood device according to claim 14, wherein the zoom lens is a detachable lens, detachable and attachable to a single lens reflex camera.

24. A lens hood device for a zoom lens of a camera, said zoom lens having a variable zooming position, said lens hood device comprising:

a lens hood movable to swing to a variable angular position and to extend to a variable hood position with respect to said zoom lens;

an assembly that senses a zooming position of said zoom lens; and a system that associates movement of said lens hood with movement of said zoom lens drive such that each angular position of said lens hood has a corresponding zooming position and viewing angle, and said variable angular position corresponds to said sensed zooming position of said zoom lens and to said viewing angle of said zoom lens.

25. The lens hood device according to claim 24, wherein said lens hood is movable to hood positions including:

a plurality of open positions, each having a corresponding opening angle at which said lens hood is angled with respect to said zoom lens; and a plurality of extension positions, each having a corresponding extension amount at which said lens hood extends from said zoom lens; and wherein said system that associates movement of said lens hood with movement of said zoom lens drive moves said lens hood to one of an opening position and an extension position such that said viewing angle of said lens hood corresponds to said sensed zooming position.

26. A lens hood device for a zoom lens of a camera, comprising:

a lens hood defining a variable opening angle and a variable extension amount with respect to said zoom lens;

a sensing assembly that senses a current focal length of said zoom lens;

a comparison system that compares said current focal length to a reference focal length;

an opening system that moves said lens hood to a position where said opening angle of said lens hood is determined according to said current focal length, when said current focal length is less than said reference focal length; and an extending system that moves said lens hood to a position where said extension amount is determined according to said current focal length, when said current focal length is not less than said reference focal length.

27. The lens hood device according to claim 26, wherein said zoom lens of said camera includes a motorized zoom lens drive, and wherein said extending system and said opening system are linked to said motorized zoom lens drive.

28. The lens hood device according to claim 27, wherein said opening system and said extending system are driven by at least one motorized lens hood drive linked to said motorized zoom lens drive.

29. The lens hood device according to claim 26, further comprising:

a detecting system that detects whether said lens hood is at a reference position, and said extending system extending said lens hood to said reference position when said current focal length is less than said reference focal length and when said lens hood is not at said reference position.

30. The lens hood device according to claim 29, wherein said reference position corresponds to a maximum extension amount of said lens hood, and wherein said opening system is operable after said detecting system detects that said lens hood is at said reference position.

31. The lens hood device according to claim 26, wherein said sensing assembly comprises a detector outputting a current focal length of said zoom lens, and wherein said lens hood device comprises a central processing unit including said comparison system, said central processing unit being responsive to said detector and connected to said opening system and to said extending system, and said central processing unit controlling said opening system and said extending system according to a result of said comparison system.

32. The lens hood device according to claim 26, further comprising:

a calculator that obtains a target position of said lens hood according to said current focal length; and said comparison system includes a system that compares a current position of said lens hood to said target position of said lens hood, one of said opening system and said extending system moving said lens hood according to a result of said system that compares a current position of said lens hood to said target position of said lens hood.

33. The lens hood device according to claim 32, wherein said calculator includes look-up device that obtains a target position of said lens hood by comparing said current focal length to a look-up table of positions of said lens hood corresponding to focal lengths of said zoom lens.

34. The lens hood device according to claim 33, wherein said look-up table comprises:

a first table of control amounts corresponding to said opening angles of said lens hood; and a second table of control amounts corresponding to said extension amounts of said lens hood.

35. The lens hood device according to claim 26, further comprising:

a retracting system that retracts said lens hood to a position of minimum extension amount when said camera is turned OFF.

36. The lens hood device according to claim 35, said retracting system comprising:

an assembly that a current position of said lens hood to said position of minimum extension amount to obtain an amount of lens hood retraction, wherein said retracting system retracts said lens hood to said position of minimum extension amount according to said amount of lens hood retraction.

37. The lens hood device according to claim 26, said zoom lens having an optical axis, and wherein said extending system moves said lens hood in a direction of said optical axis.

38. A lens hood device for a zoom lens of a camera, said lens including a lens barrel said lens hood device comprising:

means for moving said zoom lens to vary a focal length of said zoom lens;

a lens hood, said lens hood being movable from said lens barrel in a direction along an optical axis of said zoom lens to be located at a variable hood position, said lens hood being swingable to a variable opening position with respect to said optical axis;

means for detecting said focal length of said zoom lens; and means for associating movement of said lens hood with movement of said zoom lens such that each opening position of said lens hood has a corresponding angle of view of said zoom lens, each said angle of view corresponding to a focal length of said zoom lens.

* * * * *